United States Patent
Kim et al.

(10) Patent No.: US 10,795,070 B2
(45) Date of Patent: Oct. 6, 2020

(54) BACKLIGHT UNIT AND HOLOGRAPHIC DISPLAY APPARATUS INCLUDING THE SAME

(71) Applicant: SAMSUNG ELECTRONICS CO., LTD., Suwon-si (KR)

(72) Inventors: Yunhee Kim, Seoul (KR); Hoon Song, Yongin-si (KR); Joonyong Park, Suwon-si (KR); Geeyoung Sung, Daegu (KR); Hongseok Lee, Seoul (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 98 days.

(21) Appl. No.: 15/678,516

(22) Filed: Aug. 16, 2017

(65) Prior Publication Data

US 2018/0156962 A1    Jun. 7, 2018

(51) Int. Cl.
  *F21V 8/00* (2006.01)
  *G03H 1/22* (2006.01)
  *G02B 30/26* (2020.01)

(52) U.S. Cl.
  CPC .......... *G02B 6/0031* (2013.01); *G02B 30/26* (2020.01); *G03H 1/2286* (2013.01); *G03H 1/2294* (2013.01); *G02B 6/0028* (2013.01); *G03H 2223/16* (2013.01)

(58) Field of Classification Search
  CPC .. G03H 1/2294; G02B 27/225; G02B 6/0031; G02B 6/0028; G02B 2827/225
  See application file for complete search history.

(56) References Cited

U.S. PATENT DOCUMENTS

| | | | | |
|---|---|---|---|---|
| 5,224,198 A | * | 6/1993 | Jachimowicz | G02B 6/003 359/13 |
| 5,465,311 A | * | 11/1995 | Caulfield | G02B 6/34 385/27 |
| 6,580,529 B1 | * | 6/2003 | Amitai | G02B 5/32 359/13 |
| 6,847,488 B2 | * | 1/2005 | Travis | G02B 27/0081 345/6 |
| 7,499,216 B2 | * | 3/2009 | Niv | G02B 27/0172 359/566 |
| 7,751,662 B2 | * | 7/2010 | Kleemann | G02B 5/1861 385/37 |

(Continued)

FOREIGN PATENT DOCUMENTS

| | | |
|---|---|---|
| KR | 1020160026570 A | 3/2016 |
| KR | 1020160060522 A | 5/2016 |

(Continued)

*Primary Examiner* — Arman B Fallahkhair
(74) *Attorney, Agent, or Firm* — Sughrue Mion, PLLC (57) ABSTRACT

Provided are a backlight unit and a holographic display apparatus including the same. The backlight unit includes a light guide plate; an input coupler configured to guide light into the light guide plate; a light deflector configured to deflect light emitted from the input coupler and guide the deflected light to propagate within the light guide plate. The light deflector is disposed on a region of the light guide plate which does not overlap with an optical path of light incident on the input coupler. The backlight unit also includes an output coupler configured to emit the light, having been propagated within the light guide plate, to an outside of the light guide plate.

19 Claims, 7 Drawing Sheets

(56) References Cited

U.S. PATENT DOCUMENTS

| | | | | |
|---|---|---|---|---|
| 8,023,783 B2* | 9/2011 | Mukawa | ............... | G02B 6/0033 |
| | | | | 359/15 |
| 8,320,032 B2* | 11/2012 | Levola | ................. | G02B 5/1814 |
| | | | | 359/13 |
| 8,348,489 B2* | 1/2013 | Holman | ................ | G02B 6/0028 |
| | | | | 313/508 |
| 8,548,290 B2* | 10/2013 | Travers | ............... | G02B 27/0081 |
| | | | | 359/34 |
| 9,081,178 B2* | 7/2015 | Simmonds | ........... | G02B 6/0028 |
| 9,465,213 B2* | 10/2016 | Simmonds | ................ | G02B 6/34 |
| 10,191,196 B2* | 1/2019 | Morozov | .............. | G02B 6/0023 |
| 10,274,665 B2* | 4/2019 | Kim | ........................ | G02B 6/005 |
| 10,477,197 B2* | 11/2019 | Bruder | ................... | G02B 30/26 |
| 2013/0170004 A1* | 7/2013 | Futterer | ................ | G02B 6/0046 |
| | | | | 359/9 |
| 2013/0242157 A1 | 9/2013 | Border et al. | | |
| 2015/0277126 A1* | 10/2015 | Hirano | ................... | G02B 7/008 |
| | | | | 359/633 |
| 2016/0065955 A1* | 3/2016 | Kim | ..................... | G03H 1/0005 |
| | | | | 348/54 |
| 2016/0147003 A1 | 5/2016 | Morozov et al. | | |
| 2016/0255338 A1 | 9/2016 | Song et al. | | |
| 2018/0032030 A1 | 2/2018 | Kim et al. | | |
| 2018/0172893 A1* | 6/2018 | Fattal | ................... | G02B 6/0018 |

FOREIGN PATENT DOCUMENTS

| | | |
|---|---|---|
| KR | 1020160104363 A | 9/2016 |
| KR | 10-2018-0012058 A | 2/2018 |

\* cited by examiner

BACKLIGHT UNIT AND HOLOGRAPHIC DISPLAY APPARATUS INCLUDING THE SAME

CROSS-REFERENCE TO RELATED APPLICATION

This application claims priority from Korean Patent Application No. 10-2016-0166204, filed on Dec. 7, 2016, in the Korean Intellectual Property Office, the disclosure of which is incorporated herein in its entirety by reference.

BACKGROUND

1. Field

Apparatuses consistent with exemplary embodiments relate to a backlight unit and a holographic display apparatus including the same, and more particularly, to a thin backlight unit for a binocular holographic display apparatus and a thin holographic display apparatus including the thin backlight unit.

2. Description of the Related Art

A stereoscopic method and an auto-stereoscopic method have both been widely used as methods of displaying a 3-dimensional image. Examples of a stereoscopic method are a polarizing glass method and a shutter glass method, and examples of an auto-stereoscopic method are a lenticular method and a parallax barrier method. Since these methods take advantage of the binocular parallax of a viewer's eyes, not only are there are limits on increasing the number of viewpoints, but also the viewer may feel fatigue or eye strain due to the inconsistency between depth perception and the actual focus of the viewer's eyes.

Holographic display methods have been used as a way of addressing these issues by displaying a 3-dimensional image with a consistency for the viewer between depth perception and a focus of the eyes, while also providing full parallax. According to the principle of holographic display, when reference light is irradiated onto a hologram pattern having recorded therein an interfering pattern obtained by interfering material light reflected from an original object with the reference light, and then the reference light is diffracted by the hologram pattern, an image of the original object is reproduced. According to a currently-used holographic display method, a computer generated hologram (CGH) is provided to a spatial light modulator as an electric signal instead of obtaining a hologram pattern by directly exposing an original object to light. As the spatial light modulator forms the hologram pattern according to the input CGH signal and diffracts the reference light using the hologram pattern, a 3-dimensional image is be generated.

However, in order to implement a complete holographic display method, a very high resolution spatial light modulator and very large data throughput are required. In recent years, a binocular hologram method for providing holographic images to only respective view regions corresponding to the eyes of a viewer has been suggested in order to address these issues of data throughput and resolution. For example, in a binocular hologram method, a holographic image having only a single viewpoint corresponding to the left-eye view region of a viewer and a holographic image having only a single viewpoint corresponding to the right-eye view region of the viewer are generated and provided to the left eye and the right eye of the viewer, respectively. In this case, since it is not necessary to generate holographic images for the remaining viewpoints, the overall data throughput may be significantly reduced, and the resolution condition for a spatial light modulator may be satisfied even with currently-available display devices.

SUMMARY

One or more exemplary embodiments may provide a backlight unit for a binocular holographic display apparatus, wherein the backlight unit may be manufactured to be thin.

One or more exemplary embodiments may provide a thin holographic display apparatus including the backlight unit.

Additional exemplary aspects and advantages will be set forth in part in the description which follows and, in part, will be apparent from the description, or may be learned by practice of the presented exemplary embodiments.

According to an aspect of an exemplary embodiment, a backlight unit includes a light guide plate; an input coupler configured to guide light into the light guide plate; a light deflector configured to deflect light emitted from the input coupler and guide the deflected light to propagate within the light guide plate; and an output coupler configured to emit the light having been propagated within the light guide plate to the outside of the light guide plate. The light deflector is disposed on a region of the light guide plate that does not overlap with an optical path of light incident onto the input coupler.

Furthermore, the light deflector may contact the light guide plate.

Furthermore, the input coupler and the output coupler may each contact a first surface of the light guide plate.

Furthermore, the light deflector may be disposed on a second surface of the light guide plate opposite to the first surface of the light guide plate.

Furthermore, the light deflector may be disposed on a first region of the second surface that does not overlap a first region on which the input coupler is disposed.

Furthermore, the light deflector may include a first light deflector configured to deflect light in a first direction and a second light deflector configured to deflect light in a second direction, different from the first direction.

Furthermore, the first direction may be perpendicular to the second direction.

Furthermore, the first light deflector and the second light deflector may be disposed adjacent to each other on a same surface of the light guide plate.

Furthermore, the first light deflector and the input coupler may be disposed on a first surface of the light guide plate and may be adjacent to each other, and the second light deflector may be disposed on a second surface of the light guide plate, opposite to the first surface of the light guide plate.

Furthermore, light incident to the input coupler may be a coherent ray.

Furthermore, light emitted from the output coupler may be line light.

Furthermore, the input coupler may include at least one of a reflector that is inclined at a certain angle with respect to the incident light, a prism, and a blazed grating.

Furthermore, the light deflector may be spaced apart from the light guide plate, and a space between the light deflector and the light guide plate may be filled with a material having a refractive index identical to that of the light guide plate.

The light deflector may be a liquid crystal light deflector.

According to an aspect of another exemplary embodiment, a holographic display apparatus includes a first light expander configured to output line light by expanding, in a first direction, point light emitted from a first input coupler; a second light expander configured to output surface light by expanding, in a second direction perpendicular to the first direction, the line light emitted from a second input coupler; and a spatial light modulator configured to reproduced a holographic image by diffracting the surface light. At least one of the first light expander and the second light expander may include a light deflector that is configured to deflect the light incident thereon.

Furthermore, the first light expander may include a first light guide plate within which light emitted from the first input coupler propagates; and a first output coupler configured to emit the light propagated within the first light guide plate as the line light.

Furthermore, the light deflector may be in contact with the first light guide plate.

Furthermore, the first input coupler may be disposed on a first region of a first surface of the first light guide plate, and the light deflector may be disposed on a second region of a second surface of the first light guide plate, opposite to the first surface, wherein the second region does not overlap the first region.

Furthermore, the light deflector may be integrated with the spatial light modulator.

Furthermore, the light deflector may be spaced apart from the light guide plate, and a space between the light deflector and the light guide plate may be filled with a material having a refractive index identical to a refractive index of the light guide plate.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

Hereinafter, a backlight unit and a holographic display apparatus including the same according to exemplary embodiments will be described in detail with reference to the accompanying drawings. Widths and thicknesses of layers or regions shown in the accompanying drawings may be somewhat exaggerated for clarity and convenience of explanation. Like reference numerals designate like elements throughout the specification.

As used herein, the terms "comprising" or "including" should not be construed as necessarily including all of various elements or all of various steps described in the specification. Rather, it should be interpreted that some of the elements or some of the steps may not be included or additional components or additional steps may be further included.

Hereinafter, anything referred to as being "on" may include not only those being in contact with and immediately above/below/left/right, but also those being above/below/left/right without contact. Hereinafter, exemplary embodiments of the present disclosure will be described in detail with reference to the accompanying drawings.

Figure 1:
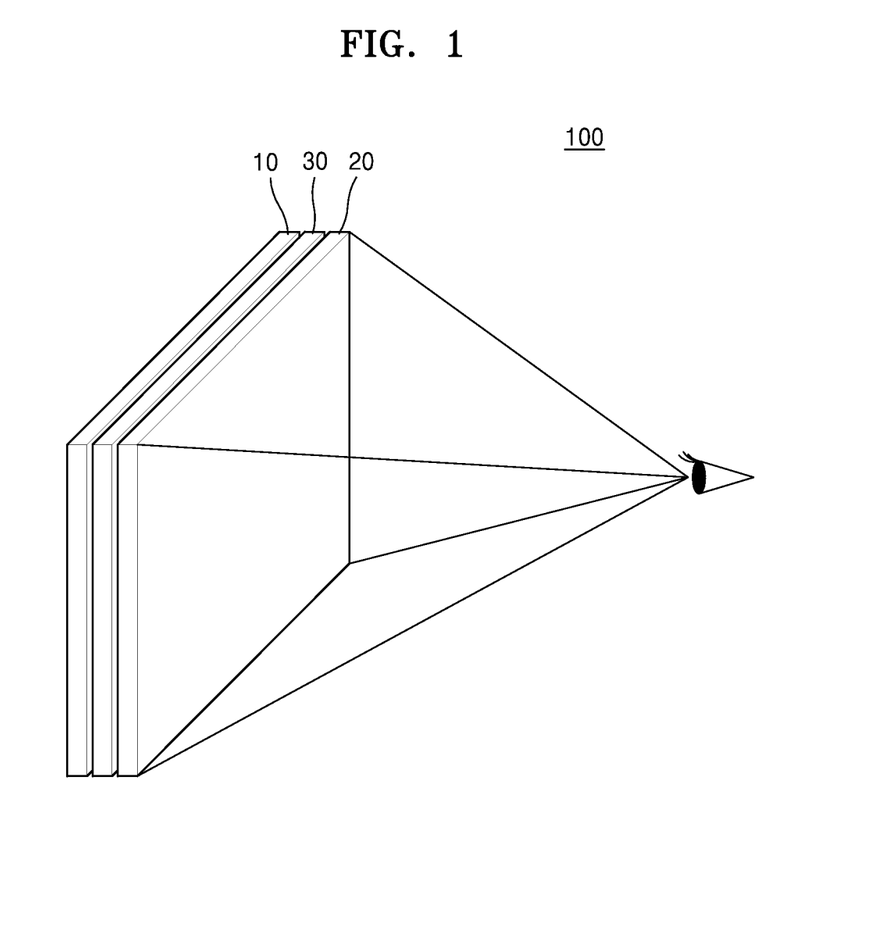
FIG. 1 is a schematic diagram showing a holographic display apparatus according to an exemplary embodiment.

While such terms as "first," "second," etc., may be used to describe various components, such components must not be limited to the above terms. The above terms are used only to distinguish one component from another FIG. 1 is a schematic diagram showing a holographic display apparatus 100 according to an exemplary embodiment. Referring to FIG. 1, the holographic display apparatus 100 according to an exemplary embodiment may include a backlight unit 10 that provides a surface light-type coherence light from a spot light-type coherent light, a spatial light modulator 20 that reproduces a holographic image using the surface light, and a lens 30 for focusing a holographic image onto a certain space.

The holographic display apparatus 100 according to an exemplary embodiment may respectively provide holographic images with different viewpoints to the left eye and the right eye of a viewer according to the binocular hologram mechanism. For example, the holographic display apparatus 100 may provide a left-eye holographic image to a left-eye view region of a viewer and a right-eye holographic image, which is a holographic image corresponding to a viewpoint different from that of the left-eye holographic image, to a right-eye view region of the viewer.

Figure 2:
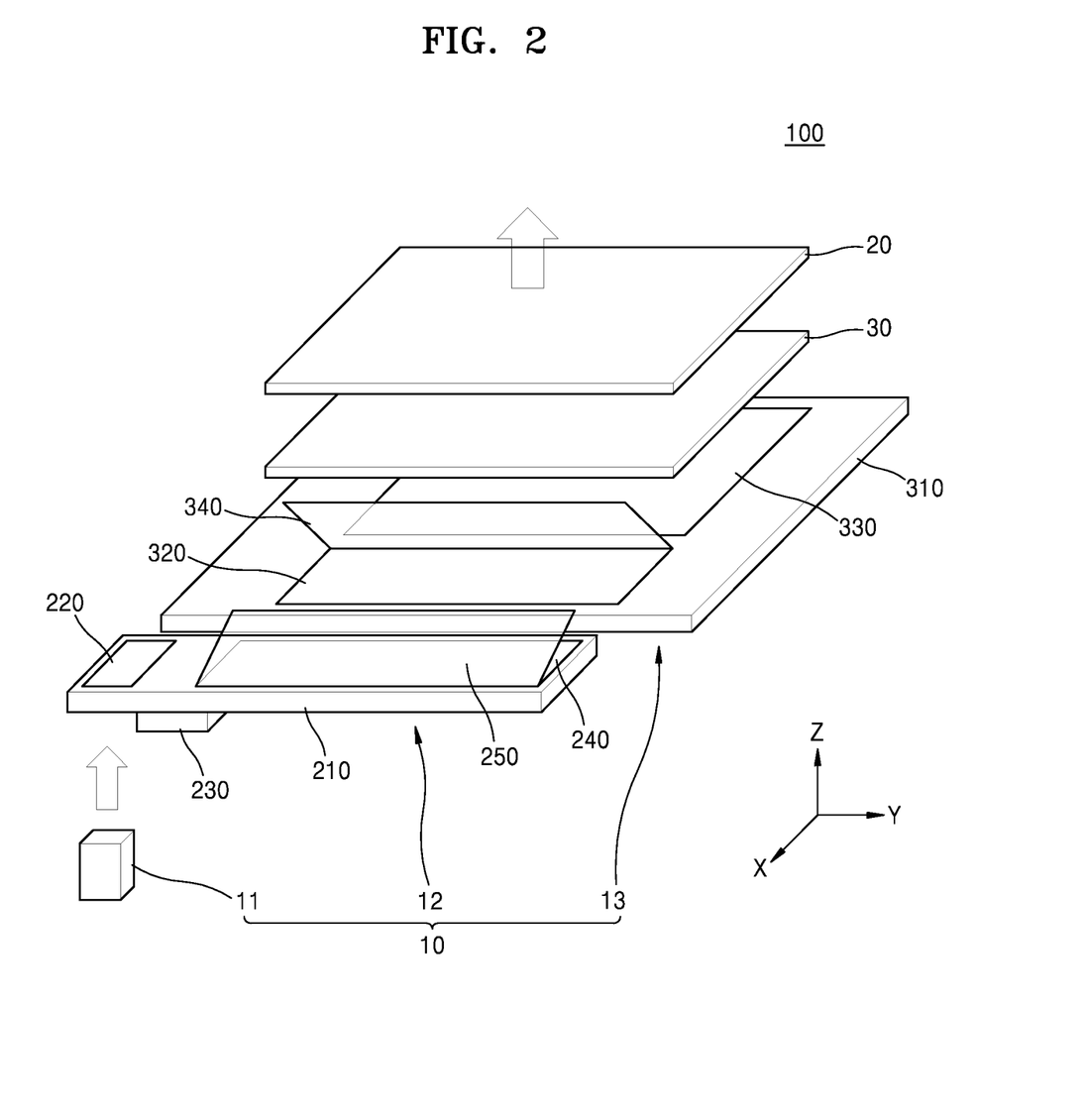
FIG. 2 is a diagram showing a specific configuration of the holographic display apparatus shown in FIG. 1 according to an exemplary embodiment.
Figure 3:
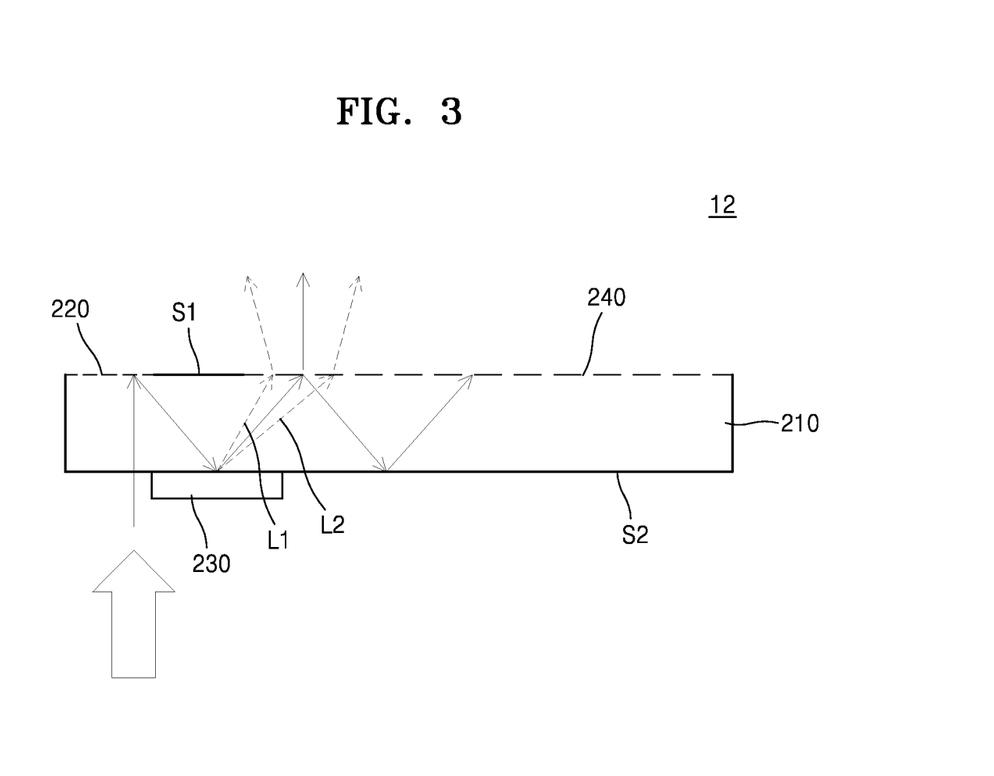
FIG. 3 is a diagram showing a cross-section of a first light expander of FIG. 2 according to an exemplary embodiment.

FIG. 2 is a diagram showing a specific configuration of the holographic display apparatus 100 shown in FIG. 1, according to an exemplary embodiment, and FIG. 3 is a diagram showing a cross-section of a first light expander 12 of FIG. 2 according to an exemplary embodiment.

Referring to FIG. 2, the holographic display apparatus 100 according to the present exemplary embodiment may include a light source 11 for providing a coherent ray, a light expander 12 that provides line light by expanding the coherent ray in a first direction, a second light expander 13 for providing surface light by expanding the line light in a second direction perpendicular to the first direction, a spatial light modulator 20 that reproduces a holographic image by diffracting the surface light, and a lens 30 for focusing the holographic image, reproduced by the spatial light modulator 20, in a certain space. Although FIG. 2 shows that the lens 30 is disposed between the spatial light modulator 20 and the second light expander 13, the location of the lens 30 is not limited thereto. For example, the lens 30 may be disposed on a front surface of the spatial light modulator 20. The light source 11, the first light expander 12, and the second light expander 13 shown in FIG. 2 are, together, referred to as the backlight unit 10.

The light source 11 may provide point light. The light source 11 may include a laser diode that generates highly-coherent light. However, when light exhibits a certain level of spatial coherence, the light may be sufficiently diffracted and modulated by the spatial light modulator 20, and thus any other light source may be used as long as light exhibiting a certain level of spatial coherence is be emitted thereby.

The light source 11 may include sub-light sources that provide light of different wavelengths. For example, the light source 11 may include a first sub-light source that provides light of a first wavelength and a second sub-light source that provides light of a second wavelength. Although not shown, a collimating lens for collimating light provided by the light source 11 may be further disposed between the light source 11 and the first light expander 12.

The first light expander 12 expands light provided by the light source 11 in the lengthwise direction, that is, in the y direction, as shown in FIG. 2, thereby changing it into line light. The first light expander 12 includes a first light guide plate 210 through which light propagates, a first input coupler 220 for guiding light emitted from the light source 11 to propagate into the first light guide plate 210, a light deflector 230 for deflecting light emitted from the first input coupler 220 and guiding the deflected light to propagate through the first light guide plate 210, and a first output coupler 240 for emitting light, propagated through the first light guide plate 210, from the first light guide plate 210. The first output coupler 240 may emit line light. Furthermore, the first light expander 12 may further include a first mirror 250 that reflects light emitted from the first output coupler 240 and guides the reflected light to be incident onto the second light expander 13.

The first light guide plate 210 includes a transparent material and may guide light to propagate via total reflection. Light incident to the first input coupler 220 is diffracted by the first input coupler 220 and propagates inside the first light guide plate 210 in the lengthwise direction of the first light guide plate 210, e.g., the y direction, as shown in FIG. 2. Light emitted from the light source 11 may be incident onto the first input coupler 220 in a vertical direction, e.g. the z direction, as shown in FIG. 2. Since the light is incident to the first input coupler 220 in a vertical direction and the light is deflected thereafter, optical efficiency may be improved by designing the first input coupler 220 to be optimized with respect to light incident thereto in the vertical direction.

Although FIGS. 2 and 3 show that the first input coupler 220 is disposed at an edge of the top surface of the first light guide plate 210, exemplary embodiments are not limited thereto. The first input coupler 220 may alternately be disposed below the first light guide plate 210. The first input coupler 220 may be a diffractive optical element that diffracts and transmits therethrough a portion of the incident light. For example, the first input coupler 220 may include a grating structure.

The light deflector 230 may deflect light, diffracted by the first input coupler 220, and guide the deflected light to propagate inside the first light guide plate 210. The light deflector 230 may be disposed in a region of the first light guide plate 210. The light deflector 230 may be disposed in a region of the first light guide plate 210 opposite to the first input coupler 220. For example, the first input coupler 220 may be disposed on a first surface S1 of the first light guide plate 210, and the light deflector 230 may be disposed on a second surface S2 of the first light guide plate 210 opposite the first surface S1. As shown in FIG. 3, the light deflector 230 may be disposed in a region of the first light guide plate 210 that does not overlap the optical path of light incident onto the first input coupler 220. For example, when light emitted from the light source 11 is incident onto the first input coupler 220 in a vertical direction, the light deflector 230 may be disposed in a region of the second surface S2 that does not overlap the region in which the first input coupler 220 is disposed. The light deflector 230 may be in contact with the first light guide plate 210. The light deflector 230 may be disposed on the first light guide plate 210 in any of various manners. Detailed description thereof is given below.

Light incident onto the first output coupler 240, from among light propagating in the first light guide plate 210, is emitted from the top surface of the first light guide plate 210. Light emitted from the first output coupler 240 may be expanded in the lengthwise direction of the first light guide plate 210. Like the first input coupler 220, the first output coupler 240 may be a diffractive optical element that diffracts and transmits therethrough a portion of the incident light. For example, the first output coupler 240 may include a grating structure.

As shown in FIG. 3, the light deflector 230 diffracts incident light and deflects the incident light at an angle different from an angle at which the incident light was originally propagating, thereby changing the incident light into light propagating in a desired direction, such as first light L1 propagating in a first direction or second light L2 propagating in a second direction. A liquid crystal light deflector may include an electrode pair, including electrodes disposed apart from each other, and a liquid crystal layer disposed between the electrodes. Therefore, an emission angle of emitted light may be changed by changing a refractive index of liquid crystals of the liquid crystal layer according to a voltage applied to the electrode pair.

The first light L1 and the second light L2, diffracted by the light deflector 230, propagate through the first light guide plate 210 at different angles. As described above, light propagating along a path different from a previous path is output through the first output coupler 240 at another emission angle. This light propagating at the other emission angle then passes through the second light expander 13 and the spatial light modulator 20 and finally propagates toward the eyes of the viewer as shown in FIG. 1. The light deflector 230 may control diffraction angles, thereby reproducing a holographic image in a viewing area corresponding to locations of the eyes of the viewer. For example, a holographic image may be reproduced for a viewer at a location toward which light deflected by the first light L1 propagates, or a holographic image may be reproduced for a viewer at a location toward which light deflected by the second light L2 in a direction different from that of the light L1 propagates. Light emitted from the first output coupler 240 is reflected by the first mirror 250 toward the second light expander 13.

As described above, when the light source 11 includes the plurality of sub-light sources, the first light expander 12 may also include a plurality of sub-light expanders. For example, when the light source 11 includes first through third sub-light sources for respectively emitting red point light, green point light, and blue point light, the first light expander 12 may include first through third light expanders for respectively emitting red line light, green line light, and blue line light.

The second light expander 13 expands the line light, provided by the first light expander 12, in the lengthwise direction, that is, the -x direction as shown in FIG. 2, thereby forming the surface light. For example, the second light expander 13 may include a second light guide plate 310 including a transparent material and guiding light to propagate in the lengthwise direction via total internal reflection, a second input coupler 320 for guiding light into the second light guide plate 310, and a second output coupler 330 for emitting light from the second light guide plate 310. Furthermore, the second optical expander 13 may further include a second mirror 340 that reflects light incident from the first optical expander 12 toward the second input coupler 320.

The light emitted from the first light expander 12 is reflected by the second mirror 340 and is incident onto the second input coupler 320. The light incident into the second light guide plate 310 by the second input coupler 320 propagates in the lengthwise direction, that is, in the -x direction, as shown in FIG. 2, in the second light guide plate 310 via total internal reflection. In other words, the direction in which light propagates inside the second light guide plate 310 may be perpendicular to the direction in which light propagates inside the first light guide plate 210. At this time, a portion of the light incident onto the second output coupler 330 is emitted through the top surface of the second light guide plate 310. Therefore, it may be considered that light expands in the lengthwise direction. To this end, the second input coupler 320 and the second output coupler 330 may be diffractive optical elements that diffract and transmit therethrough a portion of the incident light. For example, the second input coupler 320 and the second output coupler 330 may each include a grating structure.

Next, the light emitted from the second light expander 13 is incident onto the spatial light modulator 20 via the lens 30. The spatial light modulator 20 functions to form a hologram pattern having a interfering pattern for modulating incident light. As incident light is diffracted and modulated by the hologram pattern formed in the spatial light modulator 20, a holographic image may be reproduced in a certain space.

Since the first light expander 12 and the second light expander 13 are disposed on same plane, according to an exemplary embodiment, a thickness of the backlight unit 10 may be reduced. Thus, the binocular holographic display apparatus 100, for respectively providing holographic images with different viewpoints to two view regions, may be manufactured to have a small thickness. Furthermore, since the backlight unit 10 according to an exemplary embodiment may deflect two light beams at the same time, two light beams propagating in different directions may be simultaneously provided to the spatial light modulator 20 in a space-division manner instead of a time-division manner, and thus the quality of the holographic image may be improved.

Furthermore, since a light deflector according to an exemplary embodiment deflects incident light by reflecting the same, it may be referred to as a reflective light deflector. The reflective light deflector exhibits a larger deflection range as compared to a transmissive light deflector that deflects incident light by transmitting the same therethrough. For example, since the phase modulation range of the reflective light deflector is twice as large as that of the transmissive light deflector, the deflection adjustment range of the reflective light deflector may be increased. Alternatively, regarding a same deflection adjustment range, the reflective light deflector may have a thickness that is a half of that of the transmissive light deflector and may thereby reduce fringe effect. Therefore, a thin backlight unit may be easily embodied using the reflective light deflector. Furthermore, since the reflective light deflector, according to an exemplary embodiment, is arranged in contact with the first light guide plate 210 and deflects light diffracted by the first output coupler 240, a thin backlight unit may be obtained.

Although FIG. 2 shows that light is transmitted through a mirror between the first and second light expanders 12 and 13, the present disclosure is not limited thereto. The second light expander 13 may be stacked on the first light expander 12.

Figure 4:
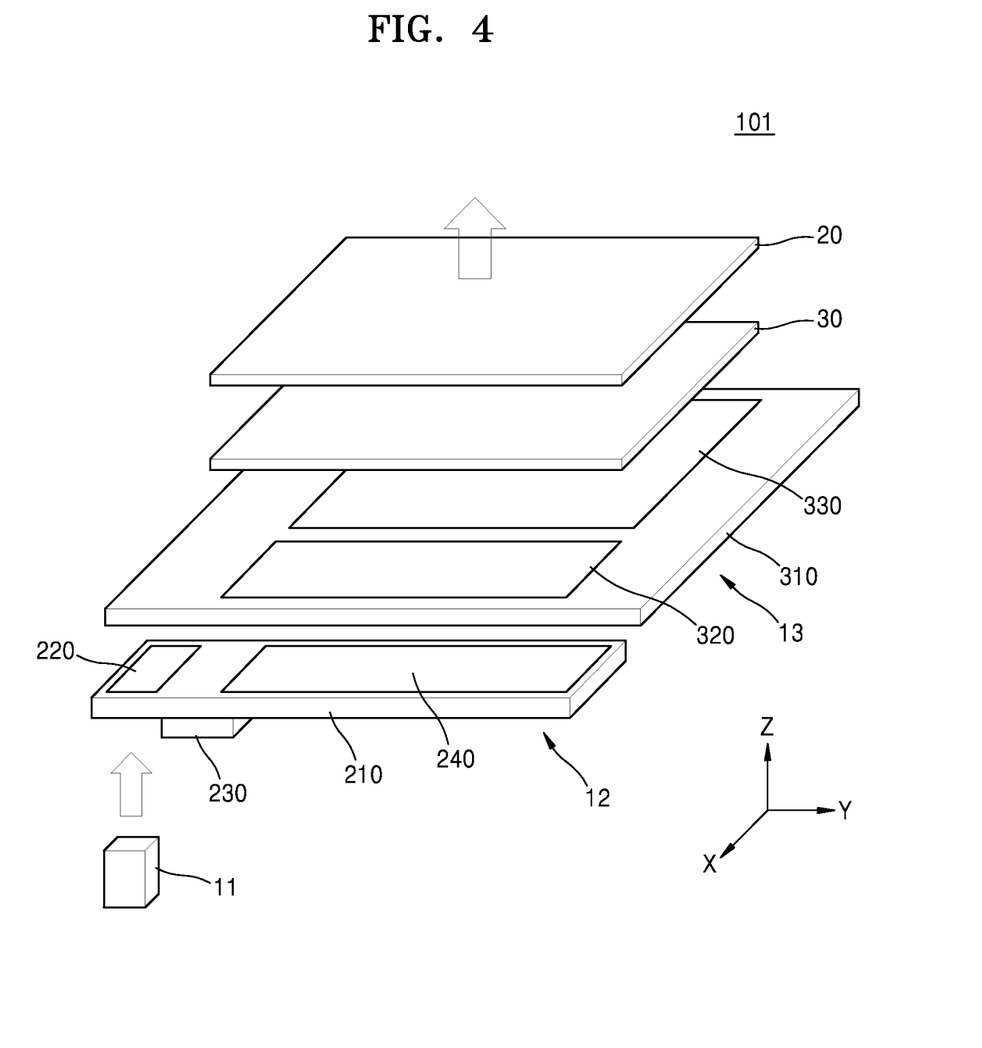
FIG. 4 is a diagram showing a holographic display apparatus according to another exemplary embodiment.

FIG. 4 is a diagram showing a holographic display apparatus 101 according to another exemplary embodiment. As shown in FIG. 4, the first light expander 12 may be disposed below the second light expander 13. For example, the first output coupler 240 of the first light expander 12 may be disposed to face the second input coupler 320 of the second light expander 13. Since a mirror is not included, the thickness of the holographic display apparatus 101 is not increased substantially.

The light deflector 230 according to an exemplary embodiment reflects light, diffracted by the first input coupler 220, into the first light guide plate 210 and may have any of various positional relationships with respect to the first light guide plate 210.

Figure 5:
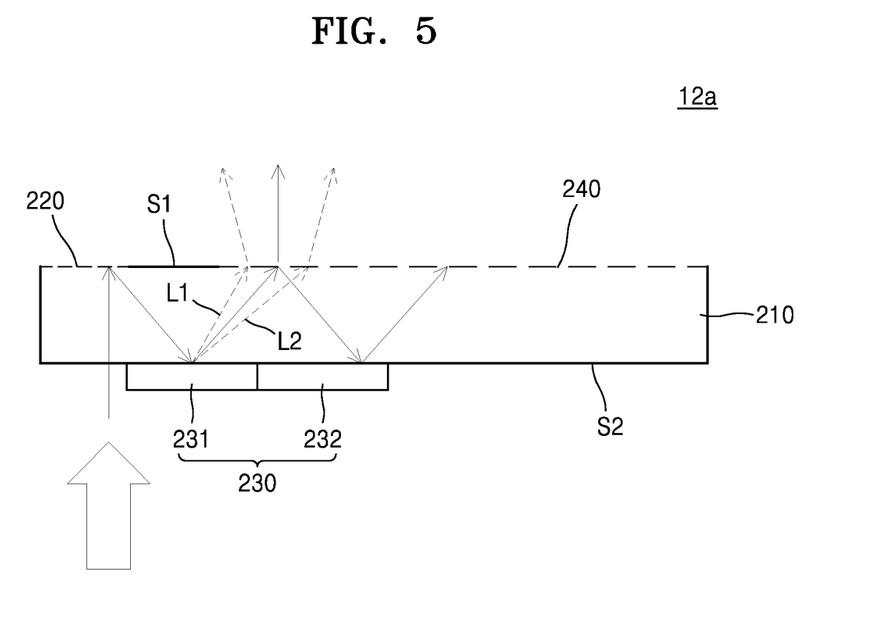
FIG. 5 is a diagram showing a first light expander including a plurality of light deflectors according to an exemplary embodiment.

FIG. 5 is a diagram showing a first light expander 12a including the plurality of sub light deflectors 231, 232 according to an exemplary embodiment. As shown in FIG. 5, the light deflector 230 may include a first light deflector 231 and a second light deflector 232 that deflect light at different angles. The respective directions in which the first light deflector 231 and the second light deflector 232 deflect light may be perpendicular to each other. For example, the first light deflector 231 may be a vertical light deflector for deflecting light in a vertical direction (an upward direction, as shown in FIG. 5), whereas the second light deflector 232 may be a horizontal light deflector for deflecting light in a horizontal direction (a left-to-right direction, as shown in FIG. 5). The vertical light deflector may deflect light in order to adjust the position of a reproduced holographic image in the vertical direction, whereas the horizontal light deflector may deflect light in order to adjust the position of the reproduced holographic image in the horizontal direction.

The first light deflector 231 and the second light deflector 232 may be disposed next to each other on a same surface of the first light guide plate 210. For example, the first light deflector 231 and the second light deflector 232 may be disposed on the second surface S2 of the first light guide plate 210. As described above, since the plurality of light deflectors 230 may be disposed on the first light guide plate 210 in a space-division manner, a large number of deflectors may be disposed without increasing the thickness of the backlight unit 10.

Figure 6:
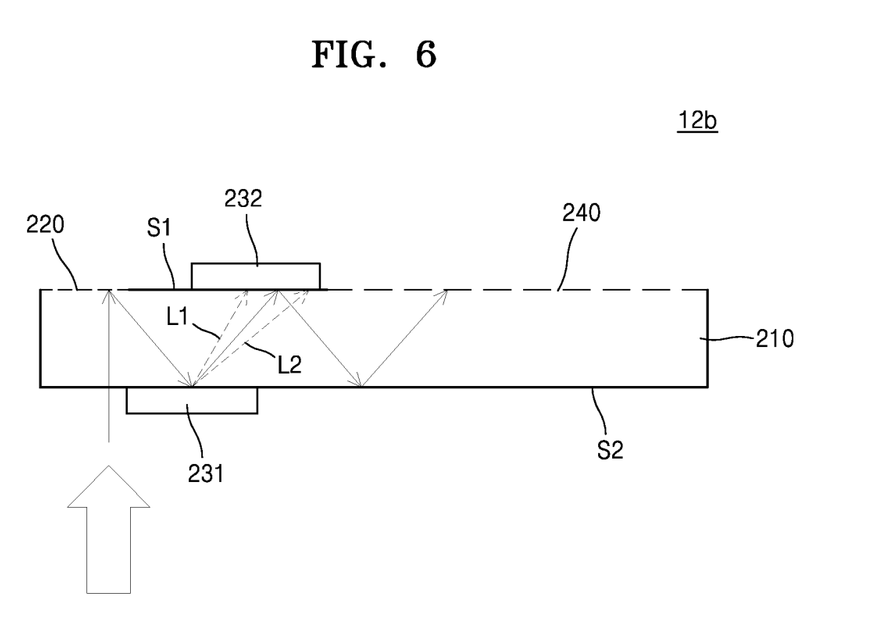
FIG. 6 is a diagram showing a first light expander including a plurality of light deflectors according to another exemplary embodiment.

Although it is described above that the first light deflector 231 and the second light deflector 232 are disposed on a same surface of the first light guide plate 210, the present disclosure is not limited thereto. FIG. 6 is a diagram showing a first light expander 12b including the plurality of light deflectors 230 according to another exemplary embodiment. As shown in FIG. 6, the first light deflector 231 may be disposed on the second surface S2, which is a surface of the first light guide plate 210 opposite to the surface on which the first input coupler 220 is disposed, whereas the second light deflector 232 may be disposed on the first surface S1, which is the surface of the first light guide plate 210 on which the first input coupler 220 is disposed, next to the first input coupler 220. For example, the second light deflector 232 may be disposed on a portion of the first surface S1 between the first input coupler 220 and the first output coupler 240. When the plurality of light deflectors 230 are arranged in a line, it is necessary for light deflected by the first light deflector 231 to be guided a certain distance until the light is deflected by the second light deflector 232. However, as shown in FIG. 6, when the first light deflector 231 is disposed on the first surface S1 and the second light deflector 232 is disposed on the second surface S2, the distance through which the light must be guided may be reduced, and thus a large effective light emission region may be secured.

In FIG. 5, the first light deflector 231 and the second light deflector 232 are shown as separate devices. However, the present disclosure is not limited thereto. A single light deflector 230 may deflect light at different angles in different regions.

Figure 7:
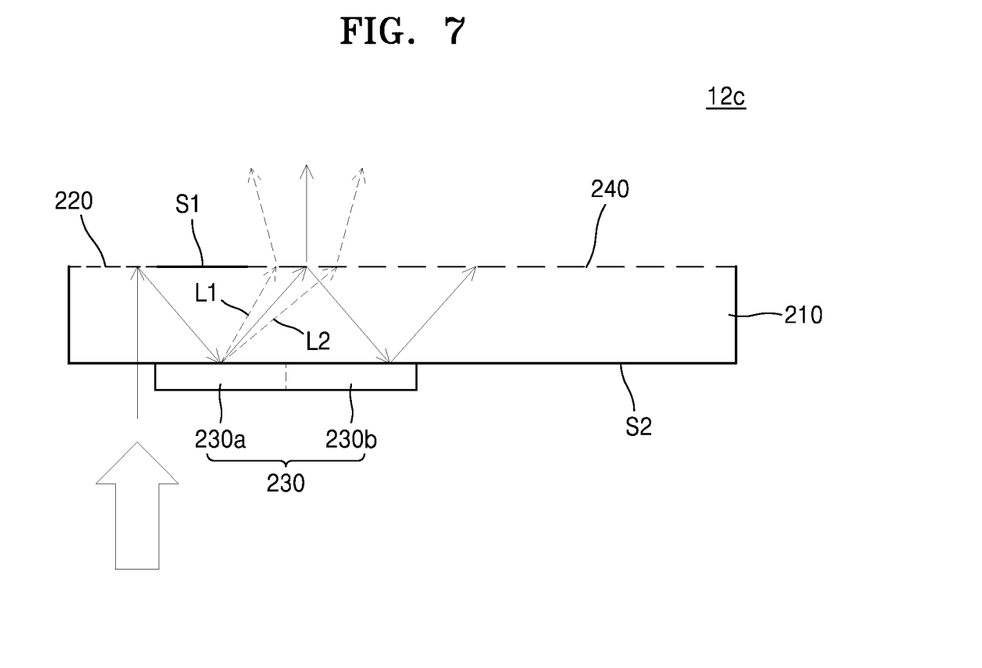
FIG. 7 is a diagram showing a first light expander including a single light deflector capable of deflecting light according to an exemplary embodiment.

FIG. 7 is a diagram showing a first light expander 12c including a single light deflector 230 capable of deflecting light according to an exemplary embodiment. As shown in FIG. 7, the light deflector 230 may include a first region 230a that deflects light in a first direction and a second region 230b that deflects light in a second direction. In other words, a deflection angle may be adjusted based on an electrical signal applied to the first region 230a and the second region 230b.

Figure 8:
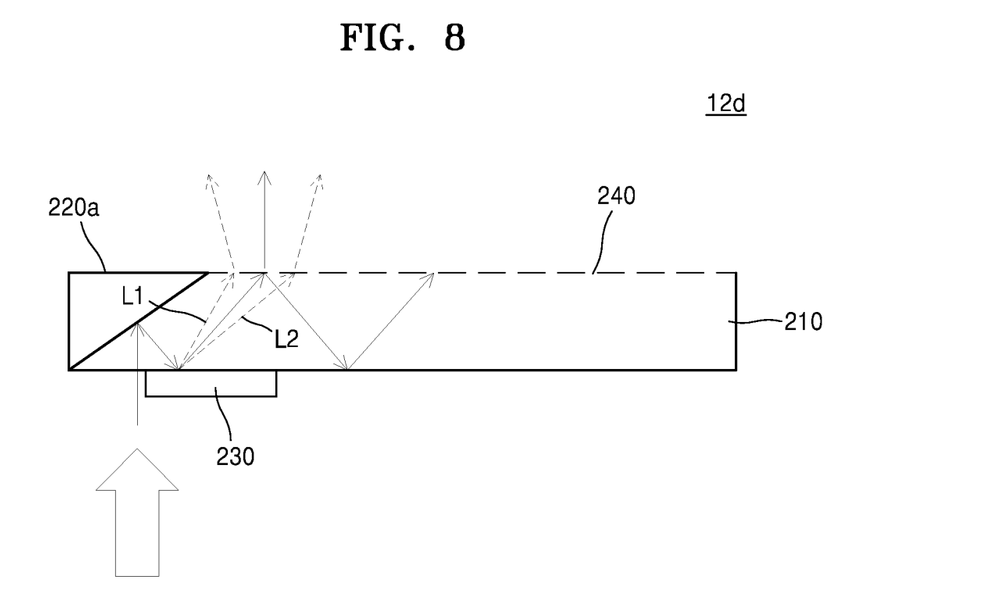
FIG. 8 is a diagram showing a first light expander including a reflector as a first input coupler according to an exemplary embodiment.

FIG. 8 is a diagram showing a first light expander 12d including a reflector 220a as a first input coupler according to an exemplary embodiment. As shown in FIG. 8, the first input coupler 220 may be the reflector 220a which is disposed in a region of the first light guide plate 210 and inclined at a certain angle with respect to light emitted from the light source 11. In addition to the reflector 220a, a prism, a blazed grating, or the like may be included in the first light expander 12d. When a reflector other than a grating structure is used as the first input coupler 220, a considerable amount of light incident onto the reflector 220a is reflected and enters into the first light guide plate 210, thereby increasing the light efficiency by about three times as compared to the grating structure.

Figure 9:
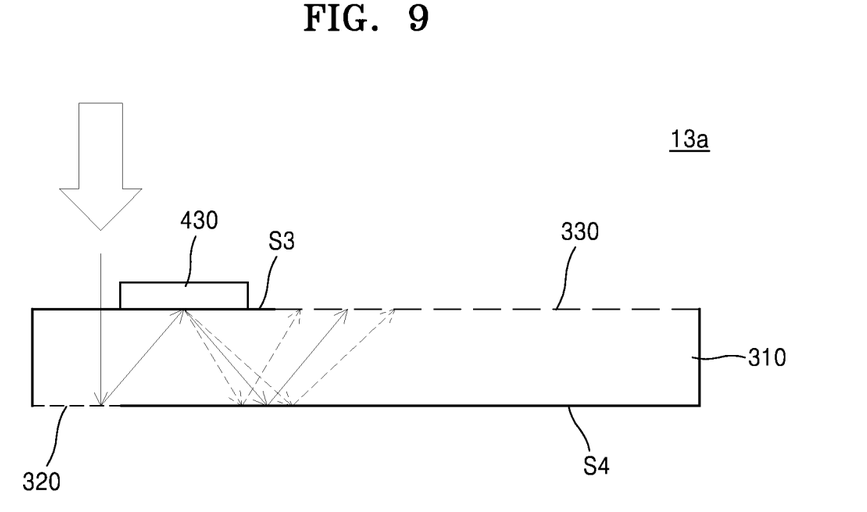
FIG. 9 is a diagram showing a second light expander including a light deflector according to an exemplary embodiment.

The light deflector 230 disposed in the first light expander 12 has been described above. However, the present disclosure is not limited thereto. A light deflector may also be disposed in the second light expander 13. FIG. 9 is a diagram showing a second light expander 13a including a light deflector 430 according to an exemplary embodiment. As shown in FIG. 9, the light deflector 430 may deflect light emitted from the second input coupler 320 and guide the deflected light to propagate in the second light guide plate 310. The light deflector 430 may be disposed on a region of the second light guide plate 310. The light deflector 430 may be disposed in a region of the second light guide plate 310 facing the second input coupler 320. For example, the second input coupler 320 may be disposed on a first surface S3 of the second light guide plate 310, and the light deflector 430 may be disposed on a second surface S4 of the second light guide plate 310, opposite the first surface S3 of the second light guide plate 310. As shown in FIG. 9, the light deflector 430 may be disposed in a region of the second light guide plate 310 that does not overlap with the optical path of light incident onto the second input coupler 320. For example, when light emitted from a first light expander is incident onto the second input coupler 320 in a vertical direction, the light deflector 430 may be disposed in a region of the first surface S3 that does not overlap with the region in which the second input coupler 320 is disposed. The light deflector 430 may be in contact with the second light guide plate 310.

Furthermore, a light deflector may be disposed in contact with the second light guide plate, a light deflector may include a plurality of sub-light deflectors that deflect light at different angles, or a single light deflector may deflect light at different angles. When a light deflector includes a plurality of sub-light deflectors, the plurality of sub-light deflectors may be disposed on a same surface of the second light guide plate next to one another or may be disposed on surfaces of the second light guide plate which face each other.

Figure 10:
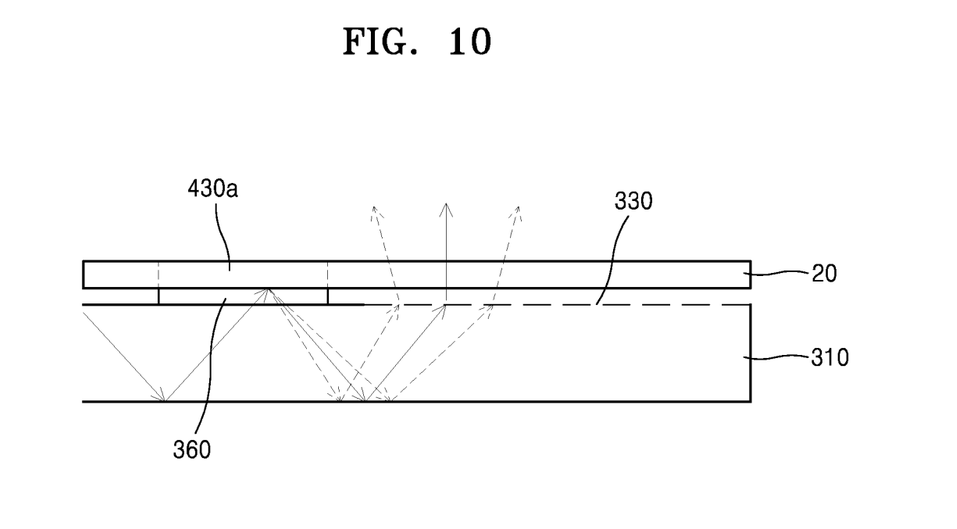
FIG. 10 is a diagram showing a light deflector according to an exemplary embodiment.

FIG. 10 is a diagram showing a light deflector according to an exemplary embodiment. As shown in FIG. 10, a light deflector 430a may be integrated with the spatial light modulator 20. Furthermore, a material 360, having a refractive index identical to that of the second light guide plate 310, may be disposed within a space between the light deflector 430a and the second light guide plate 310. As a result, light loss of light incident from the second light guide plate 310 to the light deflector 430a may be reduced.

Exemplary embodiments of the present disclosure may provide a thin backlight unit capable of deflecting light by applying a reflective light deflector contacting a light guide plate. Alternatively, exemplary embodiments of the present disclosure may provide a thin backlight unit by applying a reflective light deflector integrated with a spatial light modulator.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A backlight unit comprising:
   a light guide plate;
   an input coupler configured to diffract and guide light incident from a light source into the light guide plate;
   a light deflector disposed in a region of the light guide plate and configured to deflect light exiting the input coupler and guide the light exiting the input coupler to propagate within the light guide plate, wherein the region does not overlap with an optical path of light traveling toward and incident onto the input coupler; and
   an output coupler configured to emit light having been propagated within the light guide plate to an outside of the light guide plate,
   wherein the light deflector is further configured to deflect the light diffracted by the input coupler into a first light propagating in a first direction through the light guide plate based on a viewer being at a first position relative to the backlight unit and to deflect the light into a second light propagating in a second direction through the light guide plate based on the viewer being at a second position relative to the backlight unit, the sec- ond position being different from the first position, and the second direction being different from the first direction, and wherein the output coupler is further configured to output the first light at a first emission angle and the second light at a second emission angle, the second emission angle being different from the first emission angle, wherein the light deflector is integrated with an external device different from the light guide plate and is spaced apart from the light guide plate, and wherein a space between the light deflector and the light guide plate is filled with a material having a refractive index identical to a refractive index of the light guide plate.

2. The backlight unit of claim 1, wherein the input coupler and the output coupler each contact a first surface of the light guide plate.

3. The backlight unit of claim 2, wherein the light deflector is disposed on a second surface of the light guide plate opposite to the first surface of the light guide plate.

4. The backlight unit of claim 3, wherein the light deflector is disposed in a region of the second surface of the light guide plate that does not overlap the region in which the input coupler is disposed.

5. The backlight unit of claim 1, wherein the light deflector comprises a first light deflector configured to deflect the light emitted from the input coupler into the first light in the first direction and a second light deflector configured to deflect the light emitted from the input coupler into the second light in the second direction.

6. The backlight unit of claim 5, wherein the first direction is perpendicular to the second direction.

7. The backlight unit of claim 5, wherein the first light deflector is disposed on a first surface of the light guide plate and the second light deflector is disposed on the first surface of the light guide plate, adjacent to the first light deflector.

8. The backlight unit of claim 5, wherein the first light deflector and the input coupler are disposed on a first surface of the light guide plate and the first light deflector is adjacent to the input coupler, and the second light deflector is disposed on a second surface of the light guide plate opposite to the first surface of the light guide plate.

9. The backlight unit of claim 1, wherein the light deflector is in contact with the light guide plate.

10. The backlight unit of claim 1, wherein the light incident into the input coupler is coherent light.

11. The backlight unit of claim 1, wherein the light emitted from the output coupler is line light.

12. The backlight unit of claim 1, wherein the input coupler comprises at least one of a reflector inclined at an angle with respect to light incident thereon, a prism, and a blazed grating.

13. The backlight unit of claim 1, wherein the light deflector comprises a liquid crystal light deflector.

14. The backlight unit of claim 1, wherein the first light is deflected by the light deflector at a first angle and the second light is deflected by the light deflector at a second angle different from the first angle.

15. The backlight unit of claim 1, wherein a first image is generated by the first light at the first position and a second image different from the first image is generated by the second light at the second position.

16. A holographic display apparatus comprising:
a first light expander configured to output line light by expanding, in a first expansion direction, point light emitted from a light source and incident on an input coupler of the first light expander;
a second light expander configured to output surface light by expanding, in a second expansion direction, perpendicular to the first expansion direction, the line light;
a spatial light modulator configured to reproduce a holographic image by diffracting the surface light;
wherein the first light expander comprises:
a light guide plate;
the input coupler configured to diffract and guide the point light incident from the light source into the light guide plate;
a light deflector disposed in a region of the light guide plate and configured to deflect the light diffracted by the input coupler into a first light propagating in a first direction through the light guide plate or a second light propagating in a second direction through the light guide plate, the second direction being different from the first direction; and
an output coupler configured to output the first light at a first emission angle and the second light at a second emission angle, the second emission angle being different from the first emission angle,
wherein the light deflector is further configured to deflect the light diffracted by the input coupler into the first light propagating in the first direction based on a viewer being at a first position relative to the first light expander and to deflect the light diffracted by the input coupler into the second light propagating in the second direction based on the viewer being at a second position relative to the first light expander, the second position being different from the first position,
wherein the light deflector is integrated with the spatial light modulator and is spaced apart from the light guide plate, and
wherein a space between the light deflector and the light guide plate is filled with a material having a refractive index identical to a refractive index of the light guide plate.

17. The holographic display apparatus of claim 16, wherein the light deflector is in contact with the light guide plate.

18. The holographic display apparatus of claim 16, wherein the input coupler is disposed on a first region of a first surface of the light guide plate, and
the light deflector is disposed on a second region of a second surface of the light guide plate, opposite to the first surface, wherein the second region does not overlap with the first region.

19. The holographic display apparatus of claim 16, wherein the light deflector is integrated with the spatial light modulator.

* * * * *